(12) United States Patent
Lambricht et al.

(10) Patent No.: US 11,279,648 B2
(45) Date of Patent: Mar. 22, 2022

(54) HIGH LUMINOUS TRANSMITTANCE GLASS SHEET WITH ACHROMATIC EDGES

(71) Applicant: AGC GLASS EUROPE, Louvain-la-Neuve (BE)

(72) Inventors: Thomas Lambricht, Perwez (BE); Audrey Dogimont, Sart-Dames-Avelines (BE); Aline Degand, Bleret (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 652 days.

(21) Appl. No.: 15/735,618

(22) PCT Filed: Jun. 3, 2016

(86) PCT No.: PCT/EP2016/062589
§ 371 (c)(1),
(2) Date: Dec. 12, 2017

(87) PCT Pub. No.: WO2016/202605
PCT Pub. Date: Dec. 22, 2016

(65) Prior Publication Data
US 2019/0119146 A1    Apr. 25, 2019

(30) Foreign Application Priority Data

Jun. 18, 2015 (EP) ..................... 15172778

(51) Int. Cl.
C03C 3/087 (2006.01)
C03C 4/00 (2006.01)
(52) U.S. Cl.
CPC ............ C03C 3/087 (2013.01); C03C 4/0092 (2013.01); C03C 2204/00 (2013.01)

(58) Field of Classification Search
CPC ................................ C03C 3/087; C03C 4/0092
See application file for complete search history.

(56) References Cited

U.S. PATENT DOCUMENTS 5,030,593 A      7/1991  Heithoff
2010/0297415 A1  11/2010 Cid-Aguilar et al.

FOREIGN PATENT DOCUMENTS

| JP | 6-345483 A    |   | 12/1994 |            |
|----|---------------|---|---------|------------|
| JP | 06345483 A    | * | 12/1994 | C03C 4/085 |
| JP | 11-228176 A   |   | 8/1999  |            |
| JP | 11228176 A    | * | 8/1999  | C03C 4/082 |
| KR | 10-2009-0128674 |  | 12/2009 |           |
| KR | 20090128674 A | * | 12/2009 |            |

OTHER PUBLICATIONS

International Search Report dated Aug. 2, 2016 in PCT/EP2016/062589 filed Jun. 3, 2016.

* cited by examiner

Primary Examiner — Elizabeth A. Bolden
(74) Attorney, Agent, or Firm — Oblon, McClelland, Maier & Neustadt, L.L.P.

(57) ABSTRACT

The invention relates to glass sheet having a composition comprising the following in weight percentage, expressed with respect to the total weight of glass: Total iron (expressed in the form of $Fe_2O_3$) 0.002-0.15% Selenium (expressed in the form of Se) 0.0003-0.005% Cobalt (expressed in the form of Co) 0.00005-0.0015%; the glass sheet being characterized in that: $N \leq 10.3 \cdot Fe_2O_3 + 0.11$; N being defined as Formula (I). Such a glass sheet has a high luminous transmittance and has colorless/achromatic edges (very neutral in color). This invention is particularly suitable due to its aesthetics as building glass or interior glass, like for example in furniture applications.

19 Claims, 2 Drawing Sheets

HIGH LUMINOUS TRANSMITTANCE GLASS SHEET WITH ACHROMATIC EDGES

1. TECHNICAL FIELD OF THE INVENTION

Figure 1:
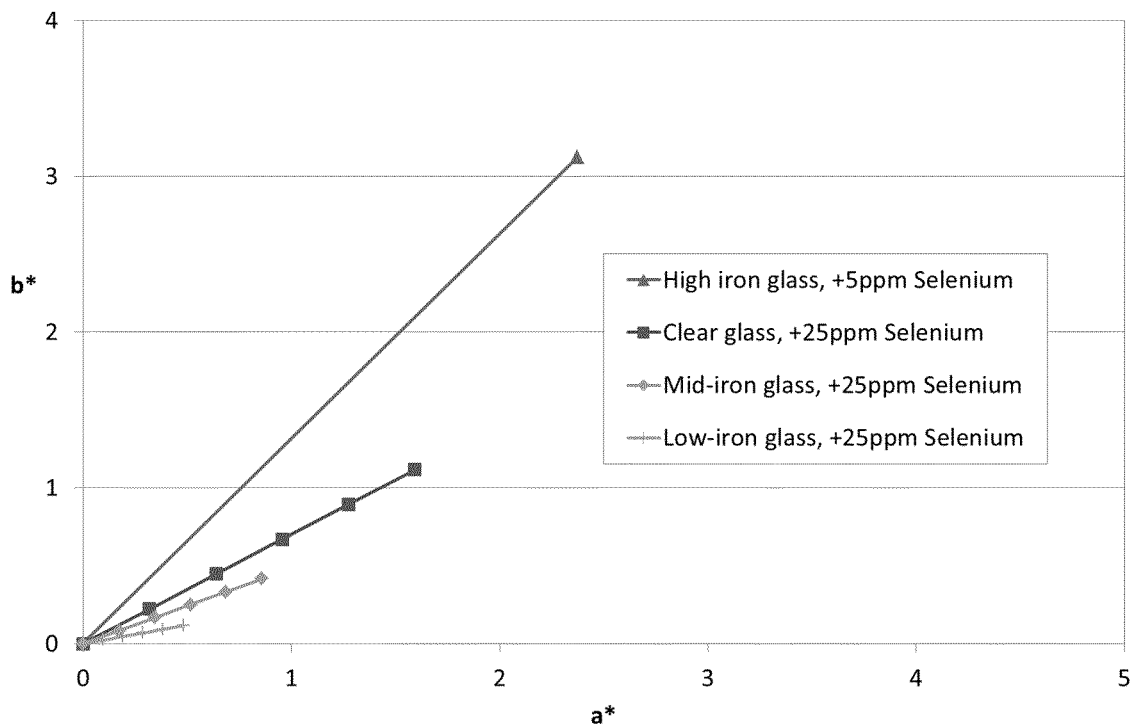

The present invention relates to a glass sheet having a high luminous transmittance and which has colorless/achromatic edges (very neutral in color). This invention is particularly suitable due to its aesthetics as building glass or interior glass, like for example in furniture applications.

2. DESCRIPTION OF THE PRIOR ART

In the art, "ultra-white" or "extra-clear" glasses are known since years in the solar or building domain, due to their high luminous and/or energetical transmittance. These glasses contain low amount of iron and are thereby also often called "low-iron glasses".

Iron exists in the glass in the form of ferric ions $Fe^{3+}$ and ferrous ions $Fe^{2+}$. The presence of ferric ions gives to the glass a slight absorption of visible light of short wavelength and a higher absorption in the near ultraviolet (absorption band centered on 380 nm), while the presence of ferrous ions (sometimes expressed as FeO oxide) causes a strong absorption in the near infrared (absorption band centered on 1050 nm). Ferric ions provide a light yellow coloration while ferrous ions give a pronounced blue-green color. Thus, the increase of the total iron content (both forms) enhances the absorption in the visible, to the detriment of light transmission.

Low-iron glasses comprise typically total iron in an amount less than 0.04 wt % or even 0.02 wt % expressed as $Fe_2O_3$ and are generally considered as substantially colorless. Nevertheless, it is a known that, even if such glasses in the form of a sheets can be qualified as colorless when looking through their main faces, their edges appear to be significantly colored (because of the elongated view path). When considering classical low-iron solar glass sheets, like for example Sunmax® glass from the Company AGC Glass Europe, one can observe, irrespective of the sheet thickness, a greenish-yellowish tint of the glass edges.

Even if colored glass edges are acceptable for many applications (like for solar applications), there are frequently aesthetic issues with a green/yellow hue, particularly if:
- the edge color has to be compatible with the decor of the room or with the other portions of the furniture of which the glass is a part; or
- if the glass is arranged directly adjacent to objects of different colors, for example in articles of furniture; or
- when the glass sheets, such as for example table tops, are arranged such that their edges are in the direct field of view of an observer.

To solve these essentially aesthetical issues, one known solution to avoid the coloration of the edges of extra-clear glass is to further decrease the total iron content in the composition of the glass sheet. However, this solution increases drastically the resulting glass cost because a very low iron content requires expensive, very pure starting materials and/or also their purification. Moreover, it is limited to a minimum level of iron for processing reasons (furnace wear highly accelerated, quality issues, yield loss, higher consumption during low-iron production).

Next to that, it has been also proposed to avoid the undesired green/yellow tint of the edges of classical extra-clear glass sheets by producing a more pleasing color (for example an azure/blue tint) that dominates over the initial green/yellow color.

To give edges with an optimized/desirable color in low-iron glass sheets, several solutions have been described:

EP0463607 B1 suggests, in addition to minimizing the iron content in the glass to less than 0.02 weight % $Fe_2O_3$ (total iron content), that the redox ratio should be increased (that-is-to-say increase the amount of ferrous ions $Fe^{2+}$) and in particular, adjusted it to at least 0.44, in order to have edges with an azure tint. However, such redox values are not straightforward to reach in conventional flat glass furnaces and under the usual melting conditions for the production of sulfate-refined soda-lime-silicate glass. It is possible to achieve such high redox values only by using special, very costly additional glass raw materials and with suitable modification of the melting process.

Moreover, such a solution gives glass sheets with bluish-greenish edges.

EP0463606 B1 teaches, with low iron content of less than 0.02 weight % $Fe_2O_3$ (total iron content), that selenium can be added in very low amounts (0.3-2 ppm) in order to obtain a honey-colored edges of a glass sheet to match/harmonize notably with wood furniture. Cobalt can optionally be added, if desired, in an amount up to 3 ppm (CoO) to render edges more neutral, approaching grey color. Unfortunately, such low amounts of selenium, which is known as a very volatile compound during glass manufacturing, gives serious issues of retention yield stability and thereby color stability of the final glass production. Moreover, such disclosed compositions only try to approach neutral color of the edges but without really achieving it.

U.S. Pat. No. 6,218,323B1 also proposes to give a blue tint to edges of a glass sheet by incorporating cobalt in the range 0.1-1 ppm (as CoO) in a soda-lime-silicate glass with total iron below 0.03 wt % (as $Fe_2O_3$). The resulting glass sheet shows a redox below 0.4 and a high light transmittance of at least 89% (TLD4). Such a solution has however some drawbacks: when industrially manufacturing a glass sheet containing from 0.1 to 1 ppm of CoO (few hundred tons/day), the following problem is likely to result: it is not straightforward to uniformly mix and disperse so very small amount of cobalt raw materials in the glass batch/melt so that fluctuation of the cobalt content in the glass tends to be substantial. Moreover, such disclosed compositions give non-neutral blue edges.

Other solutions to obtain a blue-edge glass sheet with high luminous transmittance resides in the addition, instead of cobalt, of neodymium and/or erbium. Erbium-comprising clear glasses are known for example from WO2005082799A2 disclosing compositions with total iron (expressed as $Fe_2O_3$): 0.01 to 0.30 wt % and erbium oxide (expressed as $Er_2O_3$): 0.01 to 0.30 wt %. Neodymium-comprising glasses are known for example from US2004043886A1 disclosing compositions with neodymium oxide (expressed as $Nd_2O_3$): 0.001 to 0.1 wt %. Unfortunately, the addition of erbium and/or neodymium lead to a significant additional cost of the glass due to expensiveness of erbium, neodymium raw materials. Moreover, such disclosed compositions give non-neutral blue edges.

Glass sheets with high visible light transmittance coupled with aesthetically pleasing blue edge color still receive favorable acceptance in the glass market. Nevertheless, the state of the art does not provide any solution to have a clear or low-iron glass sheet having a high luminous transmittance and having edges which are colorless/achromatic/neutral.

Yet, this is of great interest in building or interior domain to have such kind of glass with no significant visible color either from the main faces or from the edges, as it is totally neutral aesthetically and thus does not alter the global aesthetic/color rendering and is usable easily in/with any object/element (furniture, building, paint, coating . . . ) irrespective of its color. Indeed, in such an eventuality, there would be no need anymore to search for color matching between edges of glass sheets and the object integrating it or associated with it.

Neutrality/achromaticity of a glass sheet and consequently of its edges is generally evaluated through its vicinity to the illuminant (0;0 coordinate in a*b* system).

3. OBJECTIVES OF THE INVENTION

The present invention has notably the objective of overcoming the cited drawbacks of the prior art.

More precisely, one objective of the invention is to provide a glass sheet having a high luminous transmittance and having edges which are colorless/achromatic.

Another objective of the invention is to provide a glass sheet having a high luminous transmittance and having edges which are colorless/achromatic, the glass being producible simply with conventional melting/manufacturing processes.

Still another objective of the invention is to provide a glass sheet having a high luminous transmittance and having edges which are colorless/achromatic, the glass being producible without major issues of color stability.

Still another objective of the invention is to provide a glass sheet having a high luminous transmittance and having edges which are colorless/achromatic, without the need of very low amount of iron (extra-clear/ultra-white glass).

Another objective of the invention is to supply a solution to the disadvantages of the prior art that is simple and economical.

4. BRIEF DESCRIPTION OF THE DRAWINGS

Figure 2:
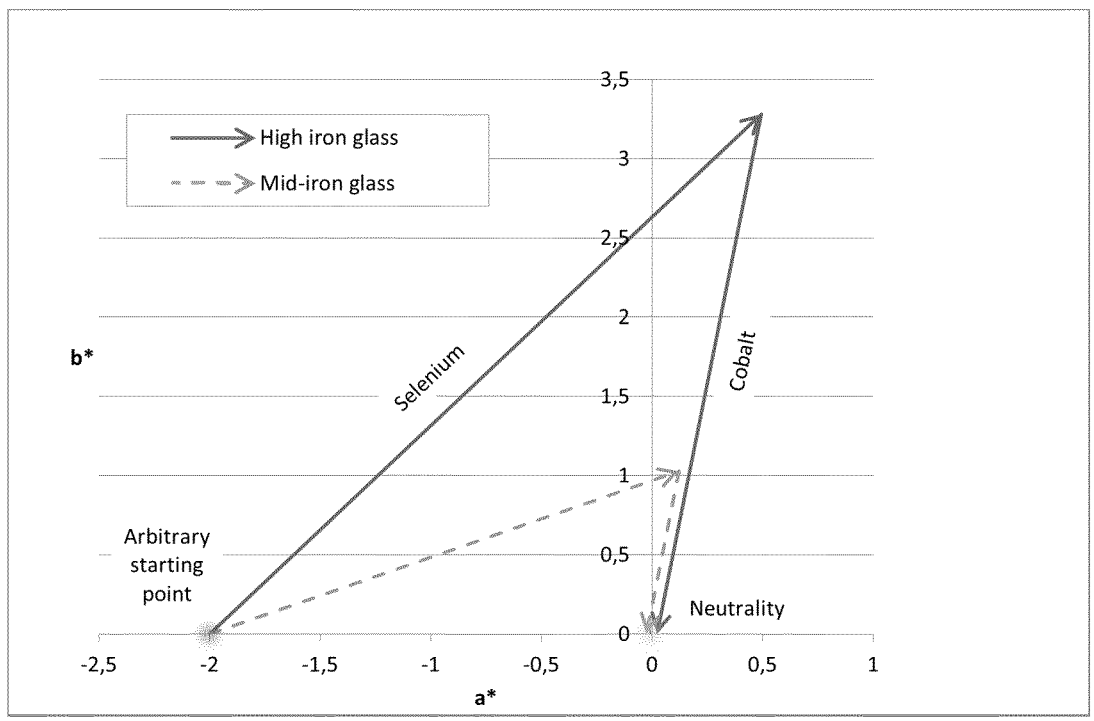
Figure 3:
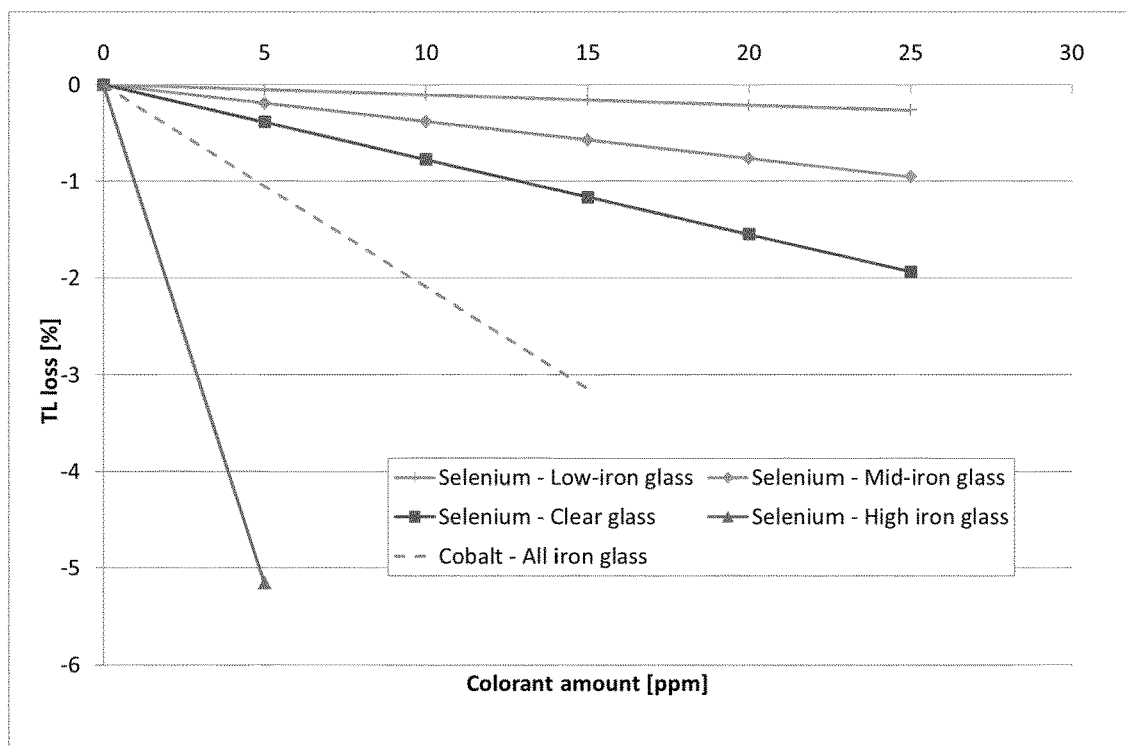
Figure 4:
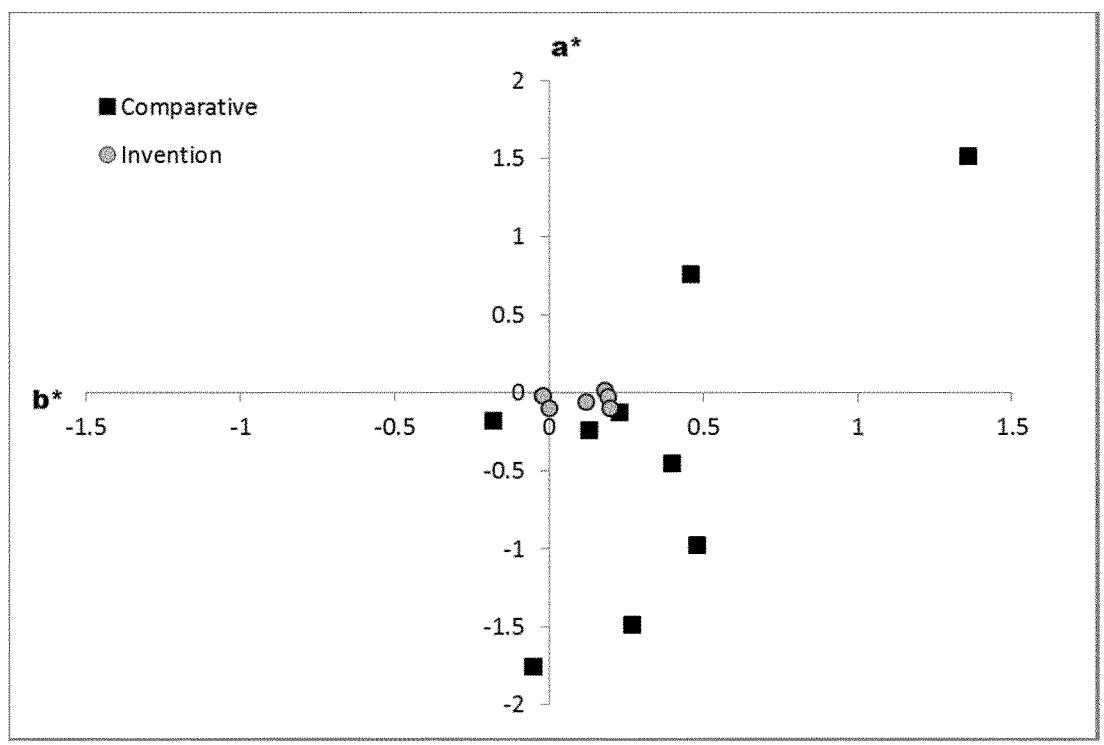

A more complete appreciation of the disclosure and its advantages will be better understood by reference to the following detailed description when considered in connection with the accompanying drawings:

FIG. 1—graph depicting coloring effect of selenium with respect to orientation and length/intensity of its coloring vector in glass of varying iron content;

FIG. 2—graph depicting coloring effect of selenium and cobalt in glass of varying iron content;

FIG. 3—graph depicting effect of selenium and cobalt content on luminous transmittance in glass of varying iron content; and FIG. 4—Plot depicting a* and b* color coordinates of glass in accordance with the inventions and comparative glass.

5. DETAILED DESCRIPTION OF THE INVENTION

The invention relates to a glass sheet having a composition comprising the following in weight percentage, expressed with respect to the total weight of glass:

Total iron (expressed in the form of Fe2O3) 0.002-0.15 wt %

Selenium (expressed in the form of Se) 0.0003-0.005 wt %

Cobalt (expressed in the form of Co) 0.00005-0.0015 wt %;

the glass sheet being characterized in that: $N \leq 10.3 \times Fe_2O_3 + 0.11$; N being defined as $N = \sqrt{a^{*2} + b^{*2}}$, $Fe_2O_3$ being the total iron content expressed in weight percentage.

Hence, the invention lies on a novel and inventive approach since it enables to find a solution for the disadvantages of prior art. The inventors have indeed found that, surprisingly, combining cobalt and selenium in an extra-clear to clear glass matrix (total iron from 0.002 to 0.15 wt %) in specific amounts (significantly higher for selenium than known low-iron glasses), allows to reach a glass sheet with very high luminous transmittance and with almost perfect or perfect neutrality (and thereby, with achromatic edges).

In the art, selenium is a glass colorant generally not used in extra-clear to clear glass matrix as, up to now, it has been established that it induces undesired high color variation and a significant loss in light transmission. Selenium is mainly known as colorant in highly colored glass (i.e. grey-bronze glass like for instance Planibel® grey and Planibel® dark grey) with high amount of iron (i.e. well above 0.3 wt %), but with very low luminous transmission (lower than 60% or even lower than 20% for dark version). As already explained above, cobalt is known as glass colorant in low-iron glass matrix but only added in extremely low amounts (less than 1 or 0.5 ppm) due to its high coloring power. Nevertheless, the combination of cobalt and selenium in very low amounts has been described in a low-iron glass matrix but the resulting glass does not achieve perfect neutrality but only tries to approach it.

The inventors have discovered that the coloring behavior of selenium in glass (orientation and length/intensity of its coloring vector) is linked to the amount of iron present in this glass, while that of cobalt remains stable whatever the iron content in glass. Moreover, the inventor have found that the addition of selenium is more and more efficient in its combination with cobalt in order to obtain very neutral glass while iron content of the glass is decreasing. As depicted in FIG. 1, the length of the coloring vector of selenium is decreased and its orientation is changed when passing from high-iron glass to low-iron glass. On this figure, it is also shown the coloring vector of cobalt as illustration (dashed line). In FIG. 1, it can be particularly seen that:

introducing selenium in high-iron matrix leads to an increase in a* and concomitant, significant increase of b* (high-iron coloring vector of selenium);

introducing selenium in extra-clear to clear matrix to achieve the same increase of a* as in high-iron matrix will result in a lower increase of b*.

Moreover, as depicted in FIG. 2, less cobalt will be required for example in a mid-iron matrix (total iron 0.043 wt %) in comparison to what can be expected based on the known high-iron coloring vector of selenium, in order to reach perfect neutrality (i.e. three times cobalt less in FIG. 2). As cobalt is known to adversely decrease light transmittance in glass (see FIG. 3), this is particularly advantageous to produce neutral glass with low level of cobalt and thus, high level of luminous transmittance.

Next to that, the coloring effect of selenium in extra-clear to clear glass matrix is unexpectedly less strong than in high-iron colored glass (see again FIG. 1) so that the invention requires significantly high amounts of selenium (≥3 ppm), compared to what is known for such glass matrix (usually less than 1 ppm) and in comparison to what can be expected based on the known high-iron coloring vector of selenium. This is particularly surprising because, in extra-clear to clear glass, if a slight color is desired for the edges for example, it is common to add only very low amount of colorants. Such high amounts of selenium in the invention, compared to other selenium-containing low-iron glasses, is advantageous also in order to guarantee color stability during glass production. Indeed, color sensitivity to variations of selenium amount into the final glass (that could occur due to volatility of selenium) will be reduced. Finally, as the coloring effect of selenium is less strong than in high iron glass, its impact on luminous transmittance is reduced even for high amounts of selenium according to the invention. This can be seen in FIG. 3, depicting the loss of luminous transmittance vs. the amount of selenium added in glass compositions with different iron contents (high iron: 0.7 wt %; clear: 0.068 wt %; mid-iron: 0.04 wt %; low-iron: 0.01 wt %). This figure also shows the loss of luminous transmittance vs. the amount of cobalt added but this loss is independent from the iron content in the glass.

In present description and claims, to evaluate the absence of color or the degree of neutrality/achromaticity of a glass sheet (and thus its edge neutrality/achromaticity), one considers CIELab values: a* and b* (measured for a sheet thickness of 5 mm, in transmission with illuminant D65, 10°, SCI). More precisely, in present description and claims, the neutrality of a glass sheet (and consequently of its edges) is evaluated through its vicinity to the illuminant (0;0 coordinate in a*b* system) and in particular, it is quantified by a "N factor" defined as:

$N = \sqrt{a^{*2} + b^{*2}}$, which has to be lowered as much as possible to go towards neutrality. According to the invention, approaching neutrality has to be defined according to total iron content of the composition. Indeed, on one hand, a classical clear glass composition is far from perfect neutrality (0;0 in a*b*) while, on the other hand a classical low-iron glass composition is closer. Rendering more neutral a glass composition according to the invention depends on the total iron content. Therefore, the glass sheet of the invention is characterized by: $N \leq 10.3 \times Fe_2O_3 + 0.11$.

Other features and advantages of the invention will be made clearer from reading the following description of preferred embodiments and figures, given by way of simple illustrative and non-restrictive examples.

Throughout the present text, when a range is indicated, the extremities are included, except if explicitly described in another way. In addition, all the integral and subdomain values in the numerical range are expressly included as if explicitly written. Also, throughout the present text, the values of content are in percentage, except if explicitly described in another way (i.e. in ppm). Moreover, throughout the present text also, values of content in percentages are by weight (also mentioned as wt %) expressed with respect to the total weight of the glass. Moreover, when a glass composition is given, this relates to the bulk composition of the glass.

In present description and claims, to quantify the luminous transmittance of a glass sheet, one considers the total light transmission with illuminant D65 (TLD) for a sheet thickness of 4 mm (TLD4) at a solid angle of observation of 2° (according to standard ISO9050). The light transmission represents the percentage of light flux emitted between wavelengths 380 nm and 780 nm which is transmitted through the glass sheet.

Preferably, the glass sheet according to the invention has a TLD4 higher than 65%, 70%, 75%, 80%, 85%, 87%, 88%, 89%, or even higher than 90%, or better higher than 90.5%, 90.75% or even more better higher than 91%.

The glass sheet according to the invention may have varied and relatively large sizes. It can, for example, have sizes ranging up to 3.21 m×6 m or 3.21 m×5.50 m or 3.21 m×5.10 m or 3.21 m×4.50 m ("PLF" glass sheet) or also, for example, 3.21 m×2.55 m or 3.21 m×2.25 m ("DLF" glass sheet). The glass sheet according to the invention may have varied thickness of from 0.1 to 25 mm.

Preferably, the glass sheet is characterized by: $N \leq 9.2 \times Fe_2O_3 + 0.1$; N being the N factor as previously defined in present description. More preferably, the glass sheet is characterized by: $N \leq 7.1 \times Fe_2O_3 + 0.07$. Even more preferably, the glass sheet is characterized by: $N \leq 4.8 \times Fe_2O_3 + 0.05$. This last embodiment is particularly advantageous as it allows mid-iron glass compositions according to the invention to be as neutral as classical low-iron glasses from the state-of-the-art (i.e. Sunmax or Clearvision). More preferably also, the glass sheet is characterized by: $N \leq 3.6 \times Fe_2O_3 + 0.04$. This last embodiment is particularly advantageous as it allows clear glass compositions (0.08 wt % total iron) according to the invention to be as neutral as classical low-iron glasses from the state-of-the-art (i.e. Sunmax or Clearvision). In the most preferable embodiment, the glass sheet is characterized by: $N \leq 2.5 \times Fe_2O_3 + 0.02$, or better: $N \leq 1.9 \times Fe_2O_3 + 0.02$, or even more better, $N \leq 1.2 \times Fe_2O_3 + 0.01$. These embodiments are particularly advantageous as they allow clear glass compositions (0.15 wt % total iron) according to the invention to be as or even more neutral than classical low-iron glasses from the state-of-the-art.

According to another embodiment, the glass sheet is characterized by: $N \leq 0.25$; $\leq 0.20$; $\leq 0.15$; $\leq 0.10$; $\leq 0.05$; or even $\leq 0.025$. These embodiments allow to approach more and more the neutrality, independently from total iron content.

According to the invention, the composition of the invention comprises total iron (expressed in terms of $Fe_2O_3$) as follows: 0.002-0.15 wt %. In present description, when talking about total iron content in glass composition, "total iron" and "$Fe_2O_3$" are used as well. The minimum value of 0.002 wt % makes it possible not to excessively damage the cost of the glass as such low iron values often require expensive, very pure, starting materials and also their purification. According to an embodiment, the composition comprises total iron as follows: 0.002-0.1 wt %. Preferably, the composition comprises total iron as follows: 0.002-0.06 wt %. More preferably, the composition comprises total iron as follows: 0.002-0.04 wt % or even, 0.002-0.035 wt %. In a very preferred embodiment, the composition comprises total iron as follows: 0.002-0.02 wt %, or even, 0.002-0.015 wt %. In the most preferred embodiment, the composition comprises total iron as follows: 0.002-0.01 wt %. The decreasing of maximum value in total iron allows to reach higher and higher values of luminous transmittance.

Alternatively, the composition of the invention preferably comprises total iron (expressed in terms of $Fe_2O_3$) as follows: 0.01-0.08 wt %. More preferably, the composition of the invention comprises total iron (expressed in terms of $Fe_2O_3$) as follows: 0.01-0.06 wt %, or even 0.01-0.04 wt %, or even more better 0.01-0.03 wt %. The most preferably, the composition of the invention comprises total iron (expressed in terms of $Fe_2O_3$) as follows: 0.01-0.02 wt %.

Alternatively, the composition of the invention preferably comprises total iron (expressed in terms of $Fe_2O_3$) as follows: 0.02-0.08 wt %. More preferably, the composition of the invention comprises total iron (expressed in terms of $Fe_2O_3$) as follows: 0.02-0.06 wt %, or even 0.02-0.04 wt %, or even more better 0.02-0.03 wt %.

Alternatively also, the composition of the invention preferably comprises total iron (expressed in terms of $Fe_2O_3$) as follows: 0.04-0.1 wt %. More preferably, the composition of the invention comprises total iron (expressed in terms of $Fe_2O_3$) as follows: 0.04-0.08 wt %, or even 0.04-0.06 wt %, or even more better 0.05-0.06 wt %.

According to the invention, the composition of the invention comprises cobalt (expressed in the form of Co) as follows: 0.00005-0.0015 wt %. Preferably, the composition comprises cobalt as follows: 0.00005-0.001 wt %. This advantageous in order to limit luminous transmittance loss while still keeping neutrality.

According to the invention, the composition of the invention comprises selenium (expressed in the form of Se) as follows: 0.0003-0.005 wt %. Preferably, the composition comprises advantageously selenium as follows: 0.0004-0.005 wt % or better: 0.0005-0.005 wt %. This increased minimum value allows to even more approach perfect neutrality. More preferably, the composition comprises selenium as follows: 0.0005-0.003%. In the most preferred embodiment, the composition comprises selenium as follows: 0.0005-0.002 wt %, or even more better 0.0005-0.0015 wt %.

Alternatively also, the composition preferably comprises selenium as follows: 0.0003-0.003 wt % and more preferably, 0.0003-0.002 wt %. These lowered maximum values allows to decrease costs but also to limit the luminous transmittance loss, while still keeping neutrality. In the most preferred embodiment, the composition comprises selenium as follows: 0.0003-0.0015 wt %.

Alternatively, the composition preferably comprises selenium as follows: 0.0004-0.003 wt % and more preferably, 0.0004-0.002 wt %. These lowered maximum values allows to decrease costs but also to limit the luminous transmittance loss, while still keeping neutrality. In the most preferred embodiment, the composition comprises selenium as follows: 0.0004-0.0015 wt %.

According to an advantageous embodiment of the invention, notably for low production costs reasons, the glass composition is a soda-lime-silicate-type glass. According to this embodiment, by "soda-lime-silicate-type glass", it is meant that the base glass matrix of the composition comprises the following in weight percentage, expressed with respect to the total weight of glass:

| | |
|---|---|
| $SiO_2$ | 60-78 wt % |
| $Al_2O_3$ | 0-8 wt % |
| $B_2O_3$ | 0-4 wt % |
| CaO | 0-15 wt % |
| MgO | 0-10 wt % |
| $Na_2O$ | 5-20 wt % |
| $K_2O$ | 0-10 wt % |
| BaO | 0-5 wt %. |

According to this embodiment, preferably, the base glass matrix of the composition comprises the following in weight percentage, expressed with respect to the total weight of glass:

| | |
|---|---|
| $SiO_2$ | 60-78 wt % |
| $Al_2O_3$ | 0-6 wt % |
| $B_2O_3$ | 0-1 wt % |
| CaO | 5-15 wt % |
| MgO | 0-8 wt % |
| $Na_2O$ | 10-20 wt % |
| $K_2O$ | 0-5 wt % |
| BaO | 0-1 wt %. |

In a preferred embodiment of the invention, the composition comprises the following in weight percentage, expressed with respect to the total weight of glass:

In a preferred embodiment of the invention, the composition comprises the following in weight percentage, expressed with respect to the total weight of glass:
 $65 \leq SiO_2 \leq 78$ wt %
 $5 \leq Na_2O \leq 20$ wt %
 $0 \leq K_2O < 5$ wt %
 $1 \leq Al_2O_3 < 6$ wt %
 $0 \leq CaO < 4.5$ wt %
 $4 \leq MgO \leq 12$ wt %;
as well as a (MgO/(MgO+CaO)) ratio $\geq 0.5$.

According to this embodiment, preferably, the composition comprises: $1 \leq Al_2O_3 < 5$ wt % or even: $1 \leq Al_2O_3 < 4$ wt %. More preferably, the composition of the float glass sheet comprises: $1 \leq Al_2O_3 \leq 3$ wt %. Alternatively, the composition of the float glass sheet comprises: $2 < Al_2O_3 < 6$ wt %. Preferably, the composition comprises: $2 < Al_2O_3 < 5$ wt % or even: $2 < Al_2O_3 < 4$ wt %. More preferably, the composition comprises: $2 < Al_2O_3 \leq 3$ wt %. Advantageously and alternatively also, $3 \leq Al_2O_3 < 6$ wt %. Preferably, the composition comprises: $3 \leq Al_2O_3 < 5$ wt % or even: $3 \leq Al_2O_3 < 4$ wt %. More preferably, the composition comprises: $4 \leq Al_2O_3 < 6$ wt % or even $4 \leq Al_2O_3 < 5$ wt %. Still according to said embodiment, preferably, the composition comprises: $0 \leq CaO < 4$ wt % and more preferably, $0 \leq CaO < 3.5$ wt %. In a very particularly preferred embodiment, the composition comprises: $0 \leq CaO < 3$ wt %. In the most preferred embodiment, the composition comprises: $0 \leq CaO < 2$ wt %. Still according to said embodiment, preferably, the composition comprises: $5.5 \leq MgO \leq 10$ wt % and more preferably, $6 \leq MgO \leq 10$ wt %. Still according to said embodiment, preferably, the composition comprises: $0 \leq K_2O < 4$ wt % and more preferably, $0 \leq K_2O < 3$ wt %, even better $0 \leq K_2O < 2$ wt %. Still according to said embodiment, preferably, the composition of the float glass sheet comprises the following: $0.5 \leq [MgO/(MgO+CaO)] < 1$. Preferably, the composition comprises the following: $0.6 \leq [MgO/(MgO+CaO)] < 1$. More preferably, the composition comprises the following: $0.75 \leq [MgO/(MgO+CaO)] < 1$. Alternatively, the composition comprises the following: $0.5 \leq [MgO/(MgO+CaO)] < 0.95$, or even more better $0.5 \leq [MgO/(MgO+CaO)] < 0.85$. More preferably, the composition comprises the following: $0.75 \leq [MgO/(MgO+CaO)] < 0.85$. According to a very preferred embodiment, the composition comprises the following: $0.88 \leq [MgO/(MgO+CaO)] < 1$. Preferably, the composition comprises the following: $0.9 \leq [MgO/(MgO+CaO)] < 1$. Alternatively, the composition comprises the following: $0.88 \leq [MgO/(MgO+CaO)] \leq 0.98$. More preferably, the composition comprises the following: $0.90 \leq [MgO/(MgO+CaO)] \leq 0.98$ or even better, $0.92 \leq [MgO/(MgO+CaO)] \leq 0.98$, or even more better $0.92 \leq [MgO/(MgO+CaO)] \leq 0.95$.

According to a particularly preferred embodiment, the composition of the invention comprises the following in weight percentage, expressed with respect to the total weight of glass:
 $65 \leq SiO_2 \leq 78$ wt %
 $10 \leq Na_2O \leq 20$ wt %
 $0 \leq K_2O < 4$ wt %
 $2 \leq Al_2O_3 \leq 3$ wt %

0<CaO<3.5 wt %
4≤MgO≤12 wt %
0.5≤[MgO/(MgO+CaO)]<1.

According to this last embodiment, the composition of the invention more preferably comprises:
65≤SiO$_2$≤78 wt %
10≤Na$_2$O≤20 wt %
0≤K$_2$O<3 wt %
2<Al$_2$O$_3$≤3 wt %
0<CaO<3.5 wt %
6≤MgO≤10 wt %
0.75≤[MgO/(MgO+CaO)]<1

Alternatively, the composition of the invention advantageously comprises:
65≤SiO$_2$≤78 wt %
10≤Na$_2$O≤20 wt %
0≤K$_2$O<3 wt %
4≤Al$_2$O$_3$<5 wt %
0<CaO<3.5 wt %
6≤MgO≤10 wt %
0.88≤[MgO/(MgO+CaO)]<1 In another preferred embodiment of the invention, the composition comprises the following in weight percentage, expressed with respect to the total weight of glass:
65≤SiO$_2$≤78 wt %
5≤Na$_2$O≤20 wt %
1 K$_2$O<8 wt %
1≤Al$_2$O$_3$<6 wt %
2≤CaO<10 wt %
0≤MgO≤8 wt %;
a K$_2$O/(K$_2$O+Na$_2$O) ratio of from 0.1 to 0.7.

According to this last embodiment, preferably, the composition comprises: 1≤Al$_2$O$_3$<5 wt % or even: 1≤Al$_2$O$_3$<4 wt %. More preferably, the composition comprises: 1≤Al$_2$O$_3$≤3 wt %. Alternatively, the composition comprises: 2<Al$_2$O$_3$<6 wt %. Preferably, the composition comprises: 2<Al$_2$O$_3$<5 wt % or even: 2<Al$_2$O$_3$<4 wt %. More preferably, the composition comprises: 2<Al$_2$O$_3$≤3 wt %. Advantageously and alternatively also, 3≤Al$_2$O$_3$<6 wt %. Preferably, the composition comprises: 3≤Al$_2$O$_3$<5 wt % or even: 3≤Al$_2$O$_3$<4 wt %. Alternatively, the composition comprises: 4≤Al$_2$O$_3$<6 wt % or even 4≤Al$_2$O$_3$<5 wt %. Still according to this last embodiment, the composition preferably comprises: 3≤CaO<10 wt % and more preferably, 4≤CaO<10 wt %. In a very particularly preferred embodiment, the composition comprises: 5≤CaO<10 wt %. In the most preferred embodiment, the composition comprises: 6≤CaO<10 wt %. Still according to this last embodiment, the composition preferably comprises: 0≤MgO≤7 wt % and more preferably, 0≤MgO≤6 wt %. In the most preferred embodiment, the composition comprises: 0≤MgO<5 wt %. Still according to this last embodiment, preferably, the composition comprises: 1≤K$_2$O<7 wt % and more preferably, 1≤K$_2$O<6 wt %. In a very particularly preferred embodiment, the composition comprises: 1≤K$_2$O<5 wt %. Alternatively, the composition comprises: 2≤K$_2$O≤6 wt %, or even better 3≤K$_2$O≤6 wt %. In the most preferred embodiment, the composition comprises: 2≤K$_2$O≤4 wt %. Still according to this last embodiment, preferably, the composition comprises a K$_2$O/(K$_2$O+Na$_2$O) ratio of from 0.1 to 0.6. More preferably, the composition comprises a K$_2$O/(K$_2$O+Na$_2$O) ratio of from 0.2 to 0.6. Alternatively, the composition of the glass sheet comprises a K$_2$O/(K$_2$O+Na$_2$O) ratio of from 0.1 to 0.5 In a very particularly preferred embodiment, the composition comprises a K$_2$O/(K$_2$O+Na$_2$O) ratio of from 0.2 to 0.5.

In a most preferred embodiment of the invention, the composition comprises a K$_2$O/(K$_2$O+Na$_2$O) ratio of from 0.2 to 0.4.

According to a particularly preferred embodiment, the composition of the invention comprises the following in weight percentage, expressed with respect to the total weight of glass:
65≤SiO$_2$≤78 wt %
8≤Na$_2$O≤15 wt %
1≤K$_2$O≤6 wt %
1≤Al$_2$O$_3$<3 wt %
4≤CaO<10 wt %
0≤MgO≤6 wt %;
a K$_2$O/(K$_2$O+Na$_2$O) ratio which is ranging from 0.1 to 0.5.

According to this last embodiment, the composition of the invention more preferably comprises:
65≤SiO$_2$≤78 wt %
8≤Na$_2$O≤15 wt %
2≤K$_2$O<6 wt %
1≤Al$_2$O$_3$<3 wt %
6≤CaO<10 wt %
0≤MgO≤6 wt %;
a K$_2$O/(K$_2$O+Na$_2$O) ratio which is ranging from 0.2 to 0.5.

In a very preferred manner, the composition of the invention comprises:
65≤SiO$_2$≤78 wt %
8≤Na$_2$O≤15 wt %
2≤K$_2$O<4 wt %
1≤Al$_2$O$_3$<3 wt %
6≤CaO<10 wt %
0≤MgO≤5 wt %;
a K$_2$O/(K$_2$O+Na$_2$O) ratio which is ranging from 0.2 to 0.4.

According to a particularly preferred embodiment, the composition is as follows: 0.003×Fe$_2$O$_3$≤Co≤0.03×Fe$_2$O$_3$; Fe$_2$O$_3$ being the total iron content expressed as Fe$_2$O$_3$ in weight percentage and Co the cobalt content expressed as Co in weight percentage. More preferably, the composition is as follows: 0.005×Fe$_2$O$_3$≤Co≤0.025×Fe$_2$O$_3$ or better, 0.006×Fe$_2$O$_3$≤Co≤0.02×Fe$_2$O$_3$. In a most preferred embodiment, the composition is as follows: 0.007×Fe$_2$O$_3$≤Co≤0.015×Fe$_2$O$_3$. Such relation between iron and cobalt contents allows approaching even more the perfect neutrality of the glass sheet and of its edges.

Most of classical extra-clear to clear soda-lime-silicate-type glass compositions does not comprise significant amount of other colorants than iron, as impurities. Nevertheless, some specific compositions may comprise some other colorants as impurities due mainly to particular contaminated raw materials. In such a case, the relationship between cobalt and iron may be adapted to ensure neutrality. For example, some compositions may comprise nickel as an impurity in significant amount (i.e. up to 0.002 wt %). In such a case, in another preferred embodiment, the composition is as follows: 0.003×Fe$_2$O$_3$<(Co−0.2×Ni)≤0.03×Fe$_2$O$_3$; Fe$_2$O$_3$ being the total iron content expressed as Fe$_2$O$_3$, Co the cobalt content expressed as Co in weight percentage and Ni being the nickel content expressed as Ni. More preferably, the composition is as follows: 0.005×Fe$_2$O$_3$≤(Co−0.2×Ni)≤0.025×Fe$_2$O$_3$ or better, 0.006×Fe$_2$O$_3$<(Co−0.2×Ni)≤0.02×Fe$_2$O$_3$. In a most preferred embodiment, the composition is as follows: 0.007×Fe$_2$O$_3$<(Co−0.2×Ni)≤0.015×Fe$_2$O$_3$.

According to an embodiment, the composition of the invention may comprises erbium (expressed as Er$_2$O$_3$) in the following weight percentage, expressed with respect to the total weight of glass: $Er_2O_3 \leq 0.3$ wt % or even, $\leq 0.15$ wt % or even better $\leq 0.1$ wt %. More preferably, the composition comprises erbium (expressed as $Er_2O_3$) in the following weight percentage, expressed with respect to the total weight of glass: $Er_2O_3 \leq 0.075$ wt % or $\leq 0.05$ wt % or even $\leq 0.03$ wt % or even better $\leq 0.02$ wt %. This can be advantageous in combination with cobalt and selenium, because it allows to approach neutrality but without decreasing luminous transmittance.

Advantageously, the glass sheet of the invention may be tempered, mechanically or chemically. It may also be bended/curved, or in a general manner, deformed to reach any desired configuration (by cold-bending, thermoforming, . . . ). It may also be laminated.

According to one embodiment of the invention, the glass sheet is coated with at least one transparent and electrically conducting thin layer. A transparent and conducting thin layer according to the invention can, for example, be a layer based on $SnO_2$:F, $SnO_2$:Sb or ITO (indium tin oxide), ZnO:Al or also ZnO:Ga.

According to another advantageous embodiment of the invention, the glass sheet is coated with at least one antireflection layer. This embodiment is obviously advantageous in the case of use of the glass sheet of the invention as front face of a screen. An antireflection layer according to the invention can, for example, be a layer based on porous silica having a low refractive index or it can be composed of several layers (stack), in particular a stack of layers of dielectric material alternating layers having low and high refractive indexes and terminating in a layer having a low refractive index.

According to another embodiment, the glass sheet is coated with at least one anti-fingerprint layer or has been treated so as to reduce or prevent fingerprints from registering. This embodiment is also advantageous in the case of use of the glass sheet of the invention as front face of a touchscreen. Such a layer or such a treatment can be combined with a transparent and electrically conducting thin layer deposited on the opposite face. Such a layer can be combined with an antireflection layer deposited on the same face, the anti-fingerprint layer being on the outside of the stack and thus covering the antireflection layer.

According to still another embodiment, the glass sheet is coated with at least one layer or has been treated so as to reduce or prevent glaring and/or sparkling. This embodiment is of course advantageous in the case of use of the glass sheet of the invention as front face of a display device. Such an anti-glare or anti-sparkling treatment is for example an acid-etching producing a specific roughness of the treated face of the glass sheet.

According to still another embodiment, the glass sheet has been treated so as to gain antibacterial properties (i.e. through a known silver treatment). Such a treatment is also advantageous in the case of use of the glass sheet of the invention as front face of a display device.

According to still another embodiment, the glass sheet is coated with at least one paint layer including enamel, organic paint, lacquer, . . . . This paint layer may advantageously be colored or white. According to this embodiment, the glass sheet may be coated on at least one face in its entire surface or only partially.

According to the applications and/or properties desired, other layer(s)/treatment(s) can be deposited/done on one and/or the other face of the glass sheet according to the invention.

The glass sheets of the invention is of particular interest if integrated in/associated with/used as objects as diversified as: furniture (tables, shelves, chairs, doors, . . . ), electronic devices, appliances, white boards, credencies, shower doors, wall panels, facades, interior partitions, lighting, . . . .

Embodiments of the invention will now be further described, by way of examples only, together with some comparative examples, not in accordance with the invention. The following examples are provided for illustrative purposes, and are not intended to limit the scope of this invention.

EXAMPLES

Different glass sheets according to the invention were prepared or calculated/simulated as 4 sets of examples, with variable amounts of total iron, selenium and cobalt.

For the Preparation of Glass Sheets of Examples:

Powder raw materials were mixed together and placed in melting crucibles, according to the same basic composition specified in the table below, and to which it has been added raw materials comprising cobalt, selenium and iron in varying amounts depending on the contents referred to in the final composition (note that iron is already at least partly present in the raw materials of the base composition as an impurity). The raw material mixture was then heated up in an electrical furnace to a temperature allowing complete melting of the raw material.

| Base composition | Amount [wt %] |
| --- | --- |
| $SiO_2$ | 72.01 |
| CaO | 7.93 |
| $K_2O$ | 0.02 |
| $Na_2O$ | 13.92 |
| $SO_3$ | 0.31 |
| $TiO_2$ | 0.02 |
| $Al_2O_3$ | 1.33 |
| MgO | 4.46 |

The optical properties of each glass sheet prepared were determined on a Perkin Elmer Lambda 950 spectrophotometer fitted with an integrating sphere of 150 mm in diameter, and in particular:

The luminous transmittance TLD4 was determined according to the ISO9050 standard to a thickness of 4 mm with a solid viewing angle of 2° (D65 illuminant) and for a wavelength range between 380 and 780 nm;

The CIE L* a*b* parameters were determined in transmission with the following parameters: Illuminant D65, 10°, 5 mm thickness.

For the Simulation/Calculation of Glass Sheets for Examples:

The optical properties of some glass sheets were calculated on the basis of optical properties of different glass colorants (using their coloring vectors in the various glass matrix).

The optical properties from examples EX4, EX7, EX14 come from simulation. The optical properties for all the other examples (EX1-3, EX5-6, EX7b, EX8-13) were measured.

Set 1

EX1 and EX2 examples (comparative) correspond to classical and commercialized clear glass sheets (sold as "Panibel® Clear"), without cobalt or selenium added. EX3 example (comparative) correspond to a commercialized blue-edge clear glass sheet (sold as "Panibel® Linea Azzura"), in which some cobalt only is added. EX4 example corresponds to a glass sheet according to the invention, comprising an amount of total iron similar to that of a classical clear glass of the state-of-the-art and in which cobalt and selenium were added according to the invention.

Table 1 shows the optical properties for examples EX1 to 4, and their respective amounts of total iron, selenium and cobalt.

TABLE 1

|  | $Fe_2O_3$ (ppm) | Se (ppm) | Co (ppm) | TLD4 (%) | a* | b* | N factor |
| --- | --- | --- | --- | --- | --- | --- | --- |
| EX1 (comp) | 800 | 0 | 0 | 89.87 | −0.98 | 0.48 | 1.09 |
| EX2 (comp) | 1100 | 0 | 0 | 89.42 | −1.49 | 0.27 | 1.51 |
| EX3 (comp) | 1210 | 0 | 2 | 88.97 | −1.76 | −0.05 | 1.76 |
| EX4 (invention) | 800 | 5 | 18 | 87.42 | 0.01 | 0.18 | 0.18 |

Results for EX3 compared to results for EX2 show the effect of the addition of cobalt, in low amount, in a clear glass matrix: EX3 is more blueish (lower b*), as known and presented commercially, and less neutral (more distant from 0;0 in the a*, b* diagram or N factor increased) than EX2.

Moreover, one can observe also that EX4 example allows to achieve the goals of the invention in a clear glass matrix, namely a high luminous transmittance, very close to that of a classical clear glass, and very neutral in color: a* and b* values are very close to 0;0 in the color diagram and the N factor is significantly reduced (even below values of classical low-iron glasses, see EX8 and EX9).

Set 2

EX5 example (comparative) corresponds to a classical mid-iron glass sheet of the state-of-the-art, without cobalt or selenium added. EX6 example (comparative) corresponds to a mid-iron glass sheet in which selenium only is added. EX7 and EX7b examples correspond to glass sheets according to the invention, with amount of total iron similar to that of a mid-iron glasses of the state-of-the-art and in which cobalt and selenium were added according to the invention.

Table 2 shows the optical properties for EX5-7, and their respective amounts of total iron, selenium and cobalt.

TABLE 2

|  | $Fe_2O_3$ (ppm) | Se (ppm) | Co (ppm) | TLD4 (%) | a* | b* | N factor |
| --- | --- | --- | --- | --- | --- | --- | --- |
| EX5 (comp) | 430 | 0 | 0 | 90.95 | −0.45 | 0.40 | 0.60 |
| EX6 (comp) | 430 | 30 | 0 | 88.77 | 1.51 | 1.36 | 2.03 |
| EX7 (invention) | 430 | 14 | 2 | 90.00 | −0.03 | 0.19 | 0.19 |
| EX7b (invention) | 410 | 3 | 2 | 89.07 | −0.1 | 0.2 | 0.21 |

Results for EX6 compared to results for EX5 show the effect of adding selenium into a mid-iron glass matrix: it induces in a known manner a loss in luminous transmittance as well as an increased distance from neutrality (0;0 in a*b* diagram).

Results for EX7 and EX7b compared to results for EX5 and EX6 show the effect of adding cobalt and selenium in a mid-iron glass matrix according to the invention: one can observe that EX7 and EX7b examples allow to achieve the goals of the invention in a mid-iron glass matrix, namely a high luminous transmittance and very neutral in color: a* and b* values are close to 0;0 in the color diagram and the N factor is significantly reduced (even below values of classical low-iron glass—see EX8 and EX9).

Set 3

EX8 example (comparative) corresponds to a classical and commercialized low-iron "extra-clear" glass sheet, without cobalt or selenium added (sold as "Sunmax® Premium"). EX9 example (comparative) correspond to a commercialized blue-edge low-iron glass sheet (sold as "Planibel Clearvision®"), in which some cobalt only is added. EX10 example (comparative) corresponds to a low-iron glass sheet in which selenium only is added. EX11 and EX12 examples correspond to glass sheets according to the invention, comprising an amount of total iron similar to that of a classical low-iron glass of the state-of-the-art and in which cobalt and selenium were added according to the invention. EX13 example according to the invention corresponds also to a low-iron glass sheet, comprising an amount of total iron reaching 230 ppm.

Table 3 shows the optical properties for EX8-13, and their respective amounts of total iron, selenium and cobalt.

TABLE 3

|  | $Fe_2O_3$ (ppm) | Se (ppm) | Co (ppm) | TLD4 (%) | a* | b* | N factor |
| --- | --- | --- | --- | --- | --- | --- | --- |
| EX8 (comp) | 110 | 0 | 0 | 91.63 | −0.13 | 0.23 | 0.26 |
| EX9 (comp) | 130 | 0 | 0.2 | 91.53 | −0.24 | 0.13 | 0.27 |
| EX10 (comp) | 110 | 36 | 0 | 90.76 | 0.76 | 0.46 | 0.89 |
| EX11 (invention) | 111 | 6 | 1.5 | 90.85 | −0.02 | −0.02 | 0.03 |
| EX12 (invention) | 110 | 5 | 0.8 | 91.11 | −0.06 | 0.12 | 0.13 |
| EX13 (invention) | 230 | 3 | 1.4 | 90.44 | −0.10 | 0.0 | 0.05 |

Results for EX9 compared to results for EX8 show the effect of the addition of cobalt, in low amount, in a low-iron glass matrix. One can observe two consequences following this cobalt addition: EX9 is more blueish (lower b*), as known and presented commercially than EX8, but not more neutral.

Results for EX10 compared to results for EX8 show the effect of introducing selenium into a low-iron glass matrix: EX10 is less neutral than EX8 as it is more distant from 0;0 in the a*, b* diagram and its N factor in strongly increased. Moreover, its luminous transmittance is decreased also.

Moreover, one can observe that EX11, EX12 and EX13 examples allow to achieve the goals of the invention in a low-iron glass matrix, namely a very high luminous transmittance and a very neutral color (a* and b* values are close to 0;0 in the color diagram and the N factor is significantly reduced). Indeed, next to high TLD4 (compared to known "extra-clear" glasses, see EX8 and EX9), EX12 example reaches a high neutrality while EX11 and EX13 examples show nearly perfect neutrality (N factor very low).

Set 4

EX14 example (comparative) corresponds to glass sheets with cobalt and selenium added, in amounts lower than according to present invention (for example as those disclosed in EP0463606 B1).

Table 4 shows the colorimetric properties for comparative example EX14, and its respective amounts of total iron, selenium and cobalt.

TABLE 4

| | Fe$_2$O$_3$ (ppm) | Se (ppm) | Co (ppm) | TLD4 (%) | a* | b* | N factor |
|---|---|---|---|---|---|---|---|
| EX14 (comp) | 100 | 0.7 | 1.87 | 91.23 | −0.18 | −0.18 | 0.25 |

These results shows that amount of cobalt but, above all, amount of selenium lower than in present invention does not allow to increase significantly neutrality in comparison with EX8 and EX9 (classical commercial low-iron glasses), while light transmission is decreased. Therefore, such a glass sheet cannot be qualified as almost neutral at all, contrary to glass sheets of the invention (see for example, low-iron examples from the invention EX11-13).

FIG. 4 shows a*,b* coordinates for comparative examples as well as all examples according to the invention, illustrating their respective position regarding neutrality/achromaticity (0;0 position) and the particularly effective solution proposed by the invention compared to their corresponding state-of-the art glasses, whatever the iron level (between low-iron to clear-type glasses).

The invention claimed is:

1. A glass sheet having a composition comprising, in weight percentage, expressed with respect to the total weight of glass:

| | |
|---|---|
| SiO$_2$ | 60-78 wt %; |
| Al$_2$O$_3$ | 0-8 wt %; |
| B$_2$O$_3$ | 0-4 wt %; |
| CaO | 0-15 wt %; |
| MgO | 0-10 wt %; |
| Na$_2$O | 5-20 wt %; |
| K$_2$O | 0-10 wt %; |
| BaO | 0-5 wt %, | total iron, expressed in the form of Fe$_2$O$_3$: 0.002-0.06 wt %,
selenium, expressed in the form of Se: 0.0003-0.005 wt %, and
cobalt, expressed in the form of Co: 0.00005-0.0015 wt %;
wherein: N≤10.3×Fe$_2$O$_3$+0.11; N being defined as N=√(a*$^2$+b*$^2$), and Fe$_2$O$_3$ being the total iron content expressed in weight percentage.

2. The glass sheet according to claim 1, having a composition comprising: total iron 0.002-0.04 wt %.

3. The glass sheet according to claim 1, having a composition comprising: total iron 0.002-0.02 wt %.

4. The glass sheet according to claim 1, having a composition comprising: total iron 0.002-0.01 wt %.

5. The glass sheet according to claim 1, having a composition comprising: Co 0.00005-0.001 wt %.

6. The glass sheet according to claim 1, having a composition comprising: Se 0.0004-0.005 wt %.

7. The glass sheet according to claim 1, having a composition comprising: Se 0.0004-0.003 wt %.

8. The glass sheet according to claim 1, having a composition comprising: Se 0.0004-0.002 wt %.

9. The glass sheet according to claim 1, having a composition comprising: Se 0.0005-0.005 wt %.

10. The glass sheet according to claim 1, having a composition comprising: Se 0.0005-0.003 wt %.

11. The glass sheet according to claim 1, having a composition comprising: Se 0.0005-0.002 wt %.

12. The glass sheet according to claim 1, having a composition comprising: 0.003×Fe$_2$O$_3$≤Co≤0.03×Fe$_2$O$_3$; Fe$_2$O$_3$ being the total iron content expressed as Fe$_2$O$_3$ in weight percentage and Co being the cobalt content expressed as Co in weight percentage.

13. A glass sheet having a composition comprising, in weight percentage, expressed with respect to the total weight of glass:

| | |
|---|---|
| SiO$_2$ | 60-78 wt %; |
| Al$_2$O$_3$ | 0-8 wt %; |
| B$_2$O$_3$ | 0-4 wt %; |
| CaO | 0-15 wt %; |
| MgO | 0-10 wt %; |
| Na$_2$O | 5-20 wt %; |
| K$_2$O | 0-10 wt %; |
| BaO | 0-5 wt %, | total iron, expressed in the form of Fe$_2$O$_3$: 0.002-0.10 wt %,
selenium, expressed in the form of Se: 0.0003-0.005 wt %, and
cobalt, expressed in the form of Co: 0.00005-0.0015 wt %;
wherein: N≤10.3×Fe$_2$O$_3$+0.11; N being defined as N=√(a*$^2$+b*$^2$), and Fe$_2$O$_3$ being the total iron content expressed in weight percentage, and
wherein the glass sheet has a total light transmission with illuminant D65 for a sheet thickness of 4 mm (TLD4) at a solid angle of observation of 2° (according to standard ISO9050) higher than 80%.

14. The glass sheet according to claim 13, having a composition comprising: total iron 0.002-0.06 wt %.

15. The glass sheet according to claim 13, having a composition comprising: 0.003×Fe$_2$O$_3$≤Co≤0.03×Fe$_2$O$_3$; Fe$_2$O$_3$ being the total iron content expressed as Fe$_2$O$_3$ in weight percentage and Co being the cobalt content expressed as Co in weight percentage.

16. A glass sheet having a composition comprising, in weight percentage, expressed with respect to the total weight of glass:

| | |
|---|---|
| SiO$_2$ | 65-78 wt %; |
| Al$_2$O$_3$ | 1-3 wt %; |
| B$_2$O$_3$ | 0-4 wt %; |
| CaO | 4-10 wt %; |
| MgO | 0-6 wt %; |
| Na$_2$O | 8-15 wt %; and |
| K$_2$O | 1-6 wt %; | a (K$_2$O/(K$_2$O+Na$_2$O)) ratio ranging from 0.1 to 0.5,
total iron, expressed in the form of Fe$_2$O$_3$: 0.002-0.06 wt %,
selenium, expressed in the form of Se: 0.0003-0.005 wt %, and
cobalt, expressed in the form of Co: 0.00005-0.0015 wt %;
wherein: N≤10.3×Fe$_2$O$_3$+0.11; N being defined as N=√(a*$^2$+b*$^2$), and Fe$_2$O$_3$ being the total iron content expressed in weight percentage.

17. The glass sheet according to claim 16, having a composition comprising: total iron 0.002-0.04 wt %.

18. The glass sheet according to claim 16, having a composition comprising: Se 0.0005-0.002 wt %.

19. The glass sheet according to claim 16, having a composition comprising: 0.003×Fe$_2$O$_3$≤Co≤0.03×Fe$_2$O$_3$; Fe$_2$O$_3$ being the total iron content expressed as Fe$_2$O$_3$ in weight percentage and Co being the cobalt content expressed as Co in weight percentage.

* * * * *